United States Patent [19]

Yang

[11] Patent Number: 5,003,839
[45] Date of Patent: Apr. 2, 1991

[54] STEM HAVING A FIXING DEVICE

[76] Inventor: Wen C. Yang, No. 68, Hsi Sheh Rd., Ching Shui Chen, Taichung Hsien, Taiwan

[21] Appl. No.: 586,602

[22] Filed: Sep. 21, 1990

[51] Int. Cl.$^5$ .................. B62K 21/18; B62K 21/02; F16L 17/00
[52] U.S. Cl. .................... 74/551.1; 74/551; 280/279; 403/15; 403/31; D12/118; 188/67
[58] Field of Search .................. 74/551, 551.1, 551.2, 74/551.3; 280/275, 276, 279, 280; 403/15, 31, 104, 197, 370; D12/118; 60/533; 188/83, 67

[56] References Cited

U.S. PATENT DOCUMENTS

| 2,033,578 | 3/1936 | Kittel | 188/83 |
| 3,136,149 | 6/1964 | Klein, Jr. | 74/551.1 X |
| 3,990,542 | 11/1976 | Dent et al. | 188/67 |
| 4,068,858 | 1/1978 | Harrison et al. | 74/551.1 X |
| 4,095,911 | 6/1978 | Lacroix | 74/551.1 X |
| 4,274,301 | 6/1981 | Katayama | 74/551.1 |
| 4,305,578 | 12/1981 | Dibrow et al. | 74/551.3 X |
| 4,553,769 | 11/1985 | Kawaguchi | 280/276 |
| 4,939,950 | 7/1990 | Girvin | 74/551.1 X |

FOREIGN PATENT DOCUMENTS

| 1004160 | 2/1977 | Canada | 188/83 |
| 0106312 | 1/1941 | Sweden | 74/551.1 |

Primary Examiner—Allan D. Herrmann
Assistant Examiner—Winnie Yip
Attorney, Agent, or Firm—Peter L. Michaelson

[57] ABSTRACT

A stem is fixed to a head tube of a bicycle by a fixing device. The stem has an aperture formed in a center. A hole is formed in an upper end of the vertical tube for receiving a spring and a bolt. Two holes are laterally and oppositely formed in a lower portion of the stem, and each receives a piston. The aperture and the holes are filled with oil. The pistons are pushed to engage with an inner surface of the head tube when the bolt is threaded into the upper hole so that the stem can be firmly fixed to the head tube.

2 Claims, 2 Drawing Sheets

STEM HAVING A FIXING DEVICE

BACKGROUND OF THE INVENTION

The present invention relates to a stem of a bicycle or the like, and more particularly to a stem having a fixing device.

A handle stem fixing device for a bicycle and the like is disclosed in U.S. Pat. No. 4,274,301 to Katayama. The stem 5 is fixed to the head tube 13 by a long bolt 2 and a cone 3. After a long term of using, the long bolt 2 of the coupling portion of the stem and the head tube will become loose due to vibration, shock or the like transferred to the coupling portion so that the handlebar may become loose.

The present invention has arisen to mitigate and/or obviate the afore-described disadvantages of the conventional stems.

SUMMARY OF THE INVENTION

The primary objective of the present invention is to provide a stem having a fixing device which firmly and stably fixing the stem to the head tube.

In accordance with one aspect of the invention, there is provided a stem which is fixed to a head tube of a bicycle by a fixing device. The stem has an aperture formed in a center. A hole is formed in an upper end of the vertical tube for receiving a spring and a bolt. Two holes are laterally and oppositely formed in a lower portion of the stem, and each receives a piston. A ring element is fixed to an outer end of each of the pistons. The aperture and the holes are filled with oil. When the bolt is threaded into the upper hole, the oil is pressurized to push the head portions of the pistons outward so that the ring elements are pushed to engage with an inner surface of the head tube and so that the stem can be stably and firmly fixed to the head tube by the hydraulic force of the oil.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
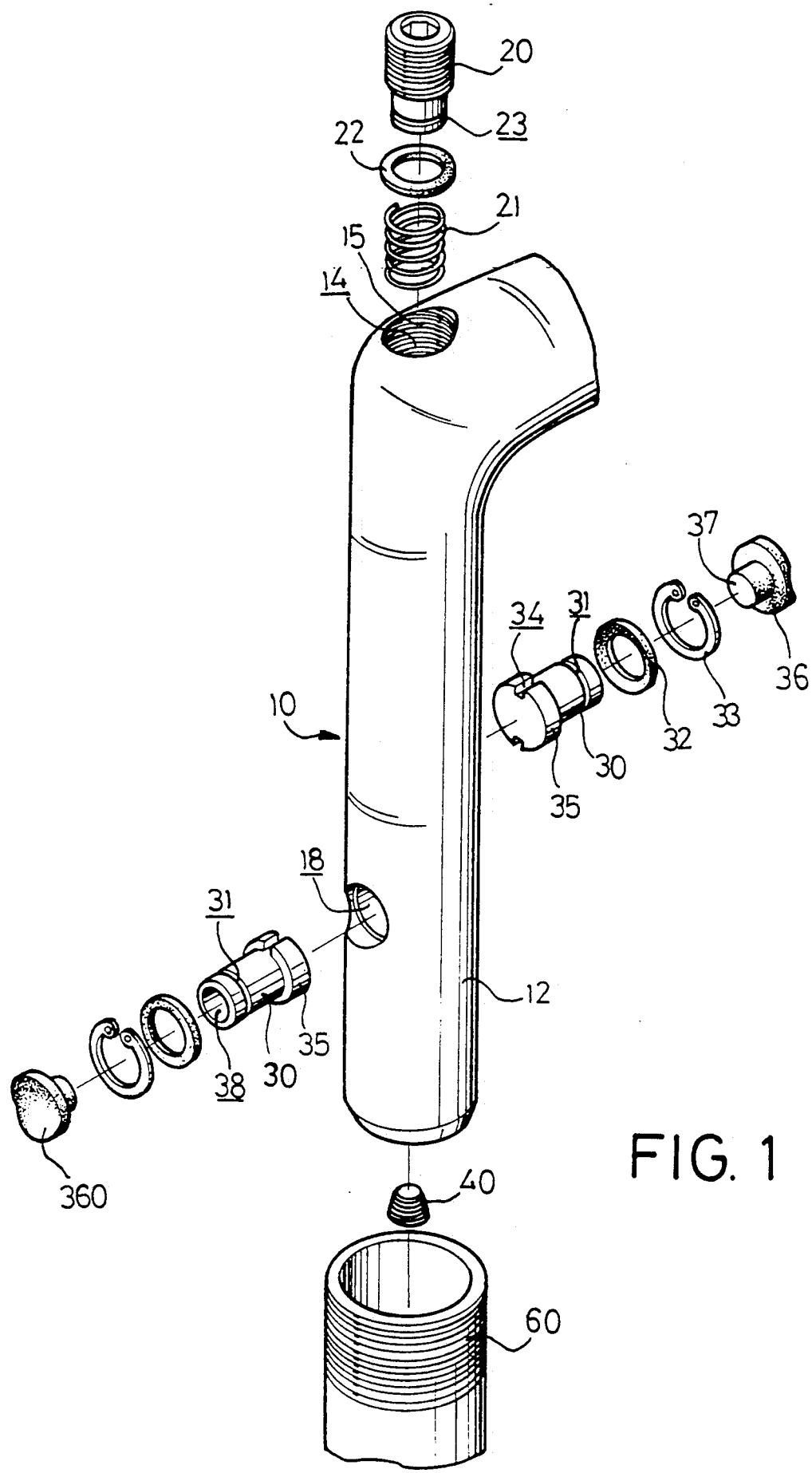
FIG. 1 is a perspective view of a stem of a bicycle or the like in accordance with the present invention.

Referring to the drawings, a fixing device in accordance with the present invention is provided for fixing a stem 10 to a head tube 60 of a bicycle or the like. The handlebar 80 of the bicycle is coupled in an opening 11 which is formed in the front and upper end of the stem 10. The head tube 60 which is integrally fixed to the frame fork of the bicycle (not shown) is rotatably received in a headset 70 of a frame of the bicycle so that the frame fork can be caused to rotate by the handlebar 80.

The fixing device is generally provided in a vertical tube 12 of the stem 10 which has an aperture 13 longitudinally formed in a center thereof. A first hole 14 is vertically formed in the upper end of the vertical tube 12 and an inner thread 15 is formed in the upper part of the first hole 14. The first hole 14 has an inner diameter larger than that of the aperture 13 so that a shoulder 16 is formed therebetween. A second hole 17 and a third hole 18 are laterally formed in the lower portion of the vertical tube 12, and each has an open end and a close end. The open ends of the second hole 17 and the third hole 18 are preferably substantially 180 degrees apart. The second hole 17 and the third hole 18 are communicated with the aperture 13. A screw hole 19 is formed in the lower end of the vertical tube 12 and is communicated with the third hole 18.

A spring 21 is received in the first hole 14 and is engaged on the shoulder 16. An annular groove 23 is formed in the lower end of the bolt 20 for receiving a sealing ring 22. The bolt 20 is threadedly engaged with the inner thread 15 of the first hole 14. The lower end of the bolt 20 contacts the upper end of the spring 21. A piston 30 is received in each of the second hole 17 and the third hole 18. An annular groove 31 is formed in one end of the piston 30 for receiving a sealing ring 32. Two notches 34 are oppositely formed in a head portion 35 of the piston 30. The head portion 35 of the piston 30 faces toward the close end of the respective hole 17 or 18. A stub 37 extends from one end of a ring element 36. The outer surface 360 of the ring element 36 is circularly curved corresponding to the curvature of the inner surface of the head tube 60 to which the ring element 36 is to be engaged. The stub 37 is force-fitted in a recess 38 formed in the outer end of the piston 30. A bolt 40 is threadedly engaged within the screw hole 19. A retaining ring 33 is engaged in the outer end portion of each of the first hole 17 and the second hole 18 between the sealing ring 32 and the ring element 36 so as to prevent the piston 30 from being separated from the respective hole 17 and 18.

Figure 2:
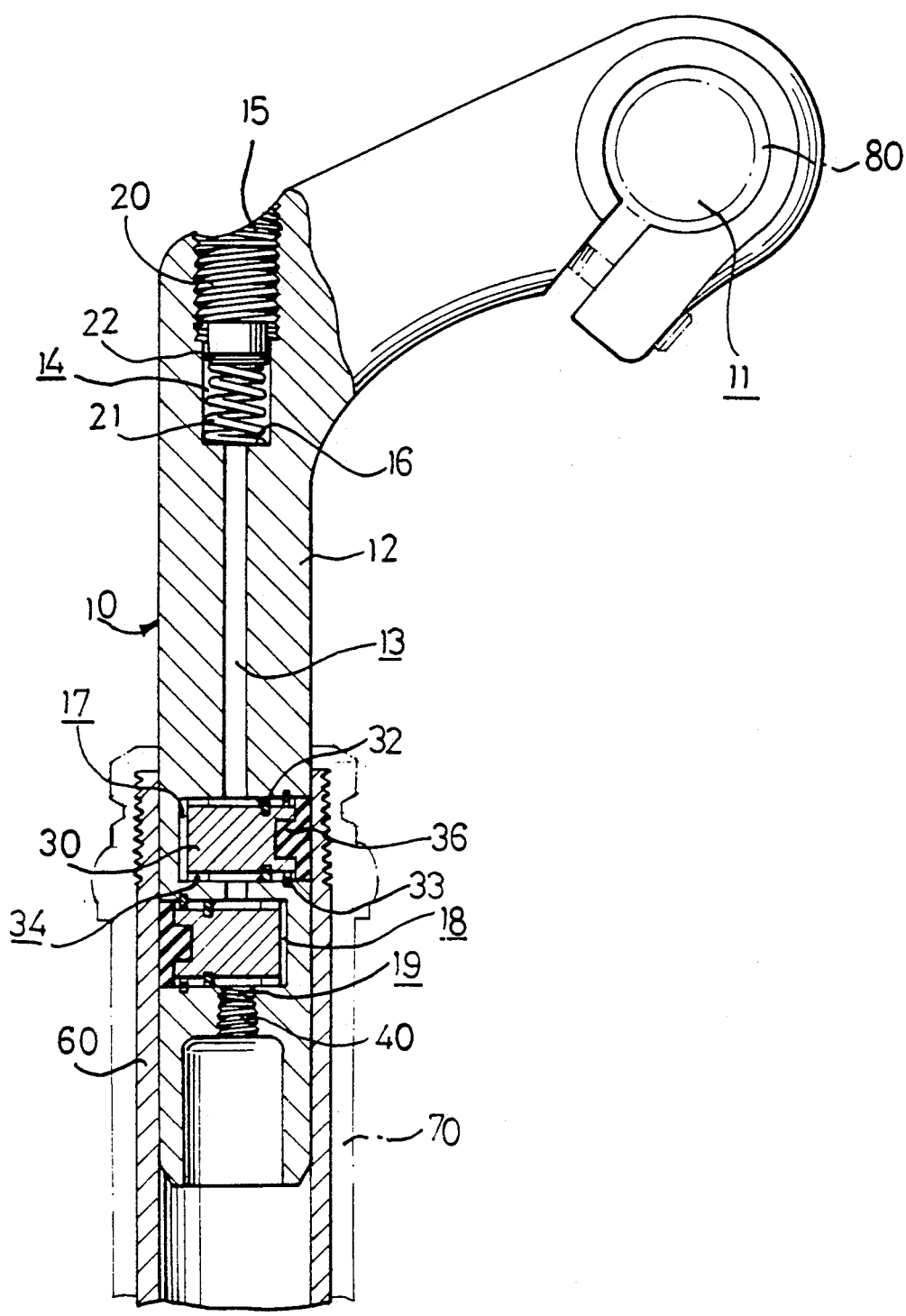
FIG. 2 is a partial cross sectional view of the stem.

Referring again to FIG. 2, the spaces in the vertical tube 12, especially the aperture 13 and the holes 14, 17, 18 are filled with oil, such as hydraulic oil. The spaces on both sides of the head portions 35 of the pistons 30 are communicated with each other by the notches 34 so that the spaces among the head portions 35 and the close ends of the second hole 17 and the third hole 18 are communicated with the aperture 13. The bolt 40 is provided to release air bubbles within the oil when the bolt 40 is unthreaded from the screw hole 19 so that the spaces in the vertical tube 12 are fully filled with the oil.

When the bolt 20 is threaded into the first hole 14, the oil filled within the spaces is pressurized by the bolt 20 so that the oil has a tendency to flow into the spaces among the head portions 35 and the close ends of the second hole 17 and the third hole 18 so that the head portions 35 of the pistons 30 will be pushed outward by the pressurized oil. The curved outer surfaces of the ring elements 36 are pushed to engage with the inner surface of the head tube 60 by the pistons 30 under the hydraulic force of the oil so that lower portion of the stem 10 can be stably and firmly fixed in the head tube 60. The curved outer surfaces the ring elements fully engage with the inner surface of the head tube 60.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A fixing device being provided for fixing a stem to a head tube of a bicycle; said stem having a vertical tube which has an aperture longitudinally formed in a center thereof; a first hole being formed in an upper end of said vertical tube and communicated with said aperture, an inner thread being formed in an upper part of said first hole; a spring being received in an inner end of said first hole; a first bolt being threadedly engaged with said inner thread of said first hole, a lower end of said first bolt being contacted with said spring; a second hole and a third hole which are communicated with said aperture being laterally formed in a lower portion of said vertical tube and each having an open end and a close end, said second hole being located higher than said third hole, said open ends of said second hole and said third hole being opposite with other; a piston which has at least one notch formed in a head portion thereof being received in each of said second hole and said third hole, said head portion of said piston facing said close end of either of said second hole or said third hole; a ring element being fixed to an outer end of each of said pistons; a screw hole being formed in a lower end of said vertical tube and communicated with said third hole, a second blot being threadedly engaged within said screw hole; an oil being filled within said aperture, said first hole, said second hole and said third hole; when said first bolt is threaded into said first hole, said oil being pressurized and having a tendency to flow into a space between said head portion of each of said pistons and said close end of either of said second hole or said third hole so that said head portions of said pistons are pushed outward in order that said ring elements are pushed to engage with an inner surface of said head tube, and so that said stem can be stably and firmly fixed to said head tube.

2. A fixing device according to claim 1, wherein a stub extends from one surface of each of the ring elements, said stub is engaged within a recess which is formed in an outer end of each of said pistons, an outer surface of each of said ring elements is curved and has a curvature similar to that of said inner surface of said head tube so that said outer surfaces of said ring elements are fully engaged with said inner surface of said head tube.

* * * * *